United States Patent [19]

D'Andrade

[11] 4,427,389

[45] Jan. 24, 1984

[54] TOY COIN CHANGER

[75] Inventor: Bruce M. D'Andrade, Whitehouse Station, N.J.

[73] Assignee: Arco Industries Ltd., Hong Kong, Hong Kong

[21] Appl. No.: 369,890

[22] Filed: Apr. 19, 1982

[51] Int. Cl.³ .................... G09B 19/00; A63H 33/30; G07D 1/00

[52] U.S. Cl. ........................................ 434/110; 46/39; 133/5 B; 434/259

[58] Field of Search .................... 434/110, 259; 46/39; 133/5 R, 5 A, 5 B, 6

[56] References Cited

U.S. PATENT DOCUMENTS

| | | | |
|---|---|---|---|
| 188,505 | 3/1877 | Fisher | 434/110 |
| 530,997 | 12/1894 | Kraump | 133/5 B |
| 1,226,181 | 5/1917 | Bruhn | 133/5 B |
| 3,488,864 | 1/1970 | McManus | 434/110 |

*Primary Examiner*—William H. Grieb
*Attorney, Agent, or Firm*—C. Hercus Just

[57] ABSTRACT

A toy of an educational nature including a plurality of receptacles in a supporting frame respectively for toy coins of different sizes and arranged to be received only in one of the receptacles as controlled by the size of the entrance opening for that particular coin. The value of the coins are prominently shown on the respective toy coins and such values are also shown adjacent the entrance openings. Ejector mechanism also is included to effect removal of the coins from the respective receptacles.

9 Claims, 5 Drawing Figures

TOY COIN CHANGER

BACKGROUND OF THE INVENTION

This invention pertains to a toy of an educational nature and especially one adapted to teach young children differences between commonly used coins and the relative values thereof. Educational aids have been used heretofore in various ways and especially for purposes of teaching language and words. So-called flash cards and the like are one example of this type of education. Teaching young children the relative value of coins, however, presents different problems from that of learning to read, particularly in relation to the relative value of various coins and the present invention is directed to that form of education.

Heretofore, attempts have been made to teach children the relative value of coins and one such example comprises the subject matter of prior U.S. Pat. No. 3,488,864, dated Jan. 13, 1970, to C. T. McManus. The device covered by said patent utilizes actual coins, whereas the present invention encompasses the use of play coins, preferably formed from plastic and therefore more in the nature of a toy as well as an educational device.

The handling of coins in cards also is old and well known, such devices being used by banks, savings institutions and the like to encourage the accumulation of coins and different sizes of openings or slots are provided in such cards respectively to receive coins of different value in certain locations on the card.

Especially for purposes of rendering the present invention in the form of a toy as well as an educational device, the invention has been adapted to a coin holding device somewhat in the nature of devices commonly used by ticket dispensers, street car conductors and many other types of personnel handling money and having need for making quick change in the nature of coins rather than paper money. Typical examples of metallic coin holder of the type referred to comprise the subject matter of relatively old prior U.S. Pat. Nos. 530,997, to C. F. Kraump, dated Dec. 18, 1894, and U.S. Pat. No. 1,226,181, to M. C. Bruhn, dated May 15, 1917. The coin holding and dispensing devices shown in said patents however show in general coin receiving slots of substantially uniform width but of different lengths corresponding to the diameters of the coins to be disposed in cylindrical receptacles and the devices also include pivoted levers such as bell cranks which actuate pivoted discharge members in the lower portions of the cylindrical receptacles. Although these prior devices suggest the structures to which the present invention has been adapted, the utilization of plastic in molded form to manufacture the present invention has required the introduction of certain structures not found in nor taught by the aforementioned prior patents, details of such plastic obstructions being set forth in the following specification.

SUMMARY OF THE INVENTION

It is among the principal objects of the present invention to provide a coin holding structure formed substantially entirely from plastic materials which are molded to provide a plurality of cylindrical receptacles respectively of different diameters corresponding to the diameters of the plurality of coins intended to be utilized in the invention, the receptacles preferably being formed in a row and extending vertically in use and related to a rear wall upon which the receptacles are mounted, the wall comprising part of a frame which includes a top extending over the upper ends of the receptacles and respectively provided with slots of different lengths and widths, said slots being related to the different diameters and different thicknesses of the play coins, these dimensions being utilized to make it impossible to place a coin in any receptacle except the one in which the top has the same shape, i.e. length and width, corresponding respectively to the diameter and thickness of the coin to be received therein.

Another object of the invention is to form the several respective coins, three different coins being arbitrarily included in the present invention for purposes of simplicity, the coins corresponding to nickels, dimes and quarters and, as in actual coins of said denominations, the toy quarters have the largest diameter, the dimes have the smallest diameter, and the nickels have a diameter intermediately of those of the dimes and quarters. The coins also prominently having the value in numerals molded therein and the opposite sides of the coins respectively have figures corresponding to those on actual of the same value, all for purposes of familiarizing a young child with what occurs on actual coins yet obviating the need for using coins which conceivably could be lost or placed in the mouths of children, this being obviated in the present invention primarily by generally making the coins of such size that the tendency to at least place the coins in the mouth of a child is minimized if not obviated.

A still further object of the invention is to arrange in the lower part of the frame coin discharge members which are ring-like and preferably have cylindrical walls of similar height corresponding to the maximum thickness of any of the play coins, whereby the lowest coin in the stack thereof in the receptacles are readily received within the ring-like members and a pivoted lever and depending leg actuator is provided for each receptacle and ring-like member for purposes of pivotally moving said members with coins therein about vertical axes and laterally swinging said members forwardly from the lower ends of the receptacle in order that the coin disposed therein may fall by gravity from the member when in discharging position forwardly of the coin holder.

Still another object of the invention is to provide certain structural members of the overall coin holder which minimize assembly operation and in general permit the formation of all pivots and support members in the form of elements molded integrally from plastic and rendered operable by assembly of the various components into the finished product.

Details of the foregoing objects and of the invention, as well as other objects thereof, are set forth in the following specification and illustrated in the accompanying drawings comprising a part thereof.

DETAILED DESCRIPTION OF THE PREFERRED EMBODIMENTS OF THE INVENTION

Figure 1:
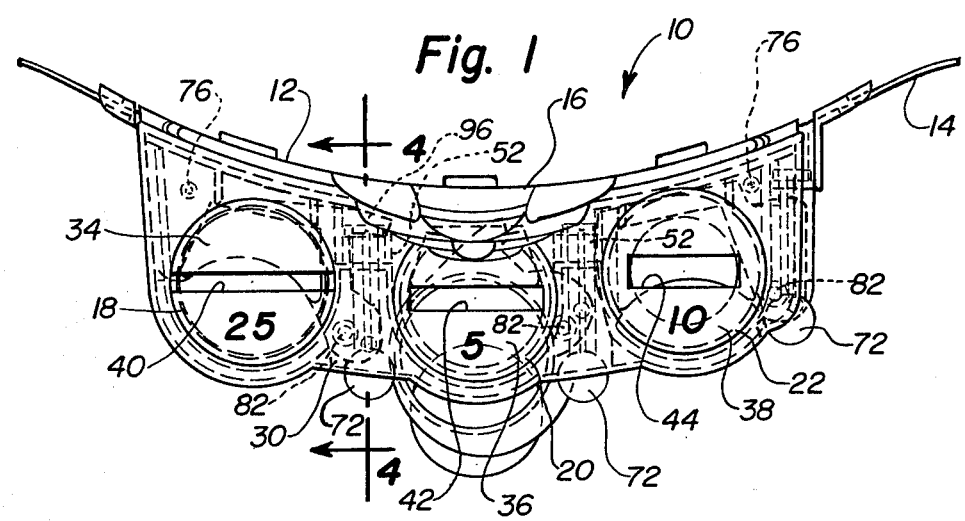
FIG. 1 is a top plan view of a preferred embodiment of the invention in which one coin dispenser is shown projected from the holder in process of discharging a coin.
Figure 2:
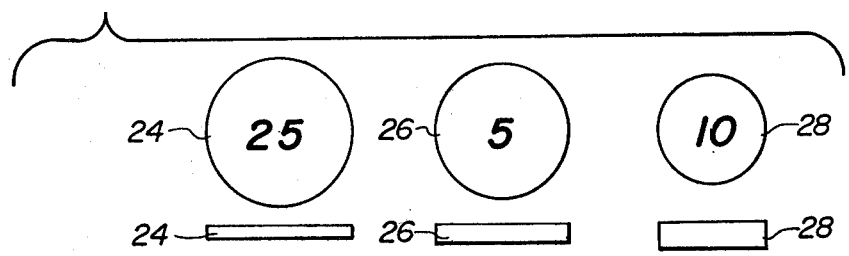
FIG. 2 is a somewhat diagramatic illustration of a plurality of coins of different values on which the value is printed and immediately below each circular illustration is a rectangle illustrating the edge view of the corresponding coin.
Figure 3:
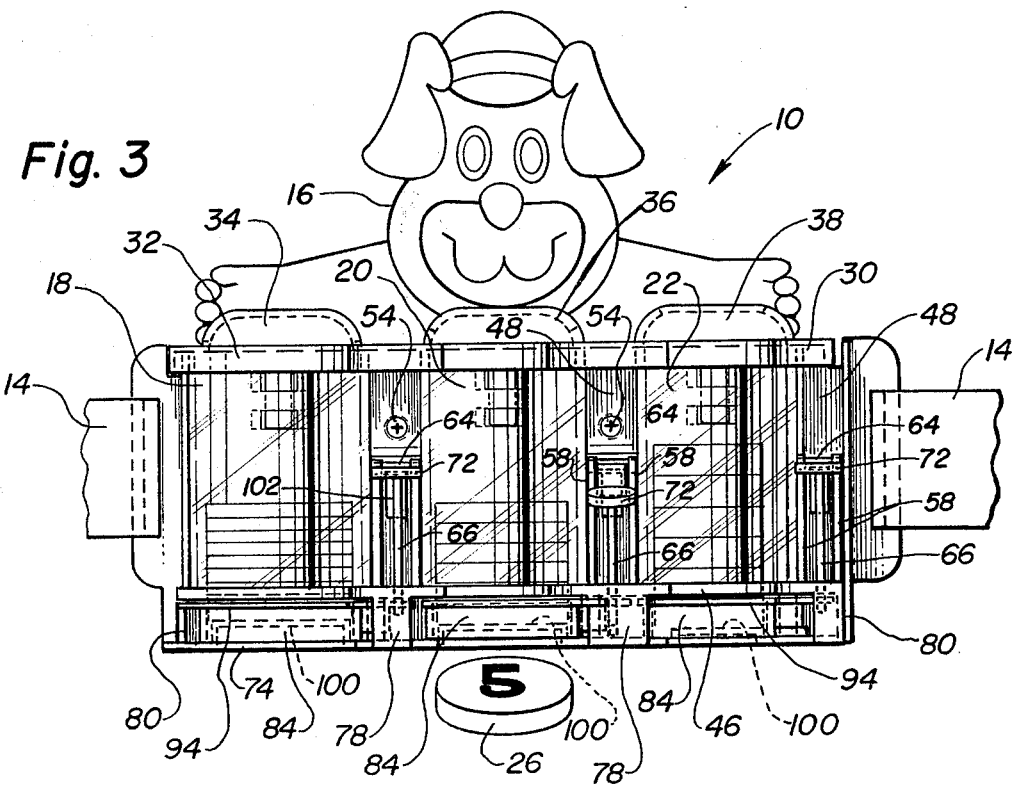
FIG. 3 is a vertical elevation of the front of the coin changer shown in FIG. 1, and also illustrating in perspective a coin which has just been discharged from the central receptacle.
Figure 4:
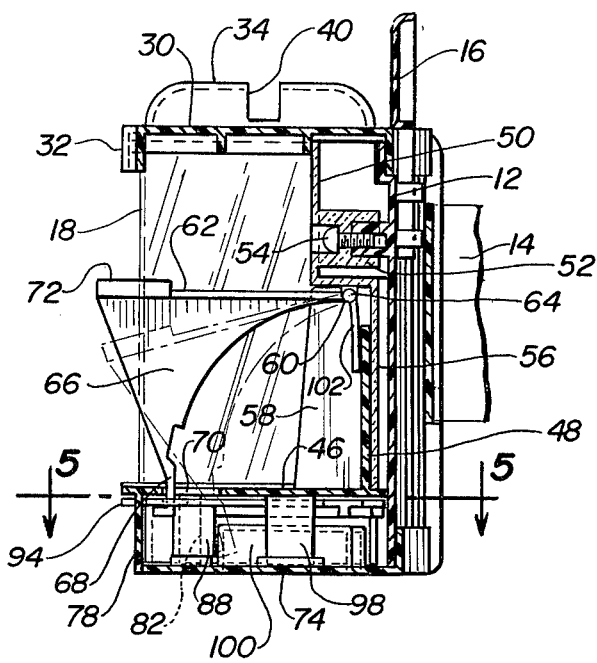
FIG. 4 is a transverse vertical sectional view showing details of the toy coin changer illustrated in FIGS. 1 and 3 as seen on the line 4—4 of FIG. 1.

For purposes of adapting the present invention to the nature of a toy and thereby facilitate the use of the educational aspect of the invention to children playing with the toy, it will be seen that the toy coin changer 10 is provided with a rear wall 12 that is somewhat arcuate as shown in plan view in FIG. 4 for purposes of enabling the changer to be mounted in the front of the torso of a child and a strap 14, shown fragmentarily in FIGS. 1 and 3, may be arranged around the waist of the child to support the changer as desired. Extending upward from the upper edge of the rear wall 12 is a fanciful figure 16 of a type which appeals to children, said figure specifically resembling a dog or bear but any other figure may be used in lieu thereof, as desired. A plurality of cylindrical receptacles 18, 20 and 22, preferably molded from clear plastic material, are supported in front of the rear wall 12 and respectively have different diameters. For example, receptacle 18 has the largest diameter and corresponds to the toy quarter 24 shown in FIG. 2. Receptacle 20 has a smaller diameter and corresponds to the nickel or five-cent piece 26, while the receptacle 22 has the smallest diameter and corresponds to the dime 28 shown in FIG. 2. From FIG. 2, it will also be seen that the respective coins are of different thicknesses.

The cylindrical receptacles are individually covered preferably by a unitary top 30 which extends across the entire width of the plurality of receptacles 18, 20 and 22 and is provided with a short downwardly extending rim 32 shaped to extend around at least the forward portions of the upper ends of said receptacles. Immediately above each of said receptacles, the top 30 is provided with a sort of flattened dome 34, 36 and 38 respectively above the receptacles 18, 20 and 22. It will be understood however that if desired, the dome configurations may be eliminated and other shapes substituted therefor, including a planar top plate extending across the upper ends of all the receptacles.

The domes 34, 36 and 38 respectively are provided with slots 40, 42 and 44, the length and thickness of which respectively corresponding to the diameters and thicknesses of the coins 24, 26 and 28 as shown in FIG. 2. By this arrangement, the quarter 24 which is of the greatest diameter, cannot be passed through the slots 42 or 44 but only may be received in the slot 40.

Because of the greater thickness of the nickel or five-cent piece 26 than the quarter 24, the nickel 26 cannot be received in the thinner slot 40 and the greater diameter of the nickel prevents it from being disposed in the shorter slot 44 for the dimes. Further, the dime 28 being of the greatest thickness, can only be received in the widest slot 44 and it will be impossible to insert it through either of the slots 40 or 42. The inclusion of the indicia as shown in FIG. 2 on the respective coins 24, 26 and 28 further enhances the educational value of the toy by acquainting a child with the appearance of the numerals designating said value.

For purposes of ejecting the coins from the respective cylindrical receptacles, the lower portion of the frame has an intermediate horizontal platform 46 which actually constitutes the bottom of each of the cylindrical receptacles and said platform has an upstanding wall 48 parallel to and spaced slightly forwardly from the rear wall 12 as best shown in FIG. 4. Also, intermediately between the endmost and central cylindrical receptacles the cylindrical walls which primarily form the same include a connecting panel 50 which is best shown in FIG. 4 and this includes a circular projection 52 through which a screw 54 extends as shown in FIGS. 3 and 4 for purposes of connecting the panel 50 to the rear wall 12 which is provided with a complementary projection that threadably receives screw 54, of which there are two as shown in FIG. 3. The connecting panel 50 also has at the lower portion thereof an offset portion 56 which is abutted by the upstanding wall 48 as clearly shown in FIG. 4.

Referring to FIGS. 3 and 4, it will be seen that the upstanding wall 48 has pairs of parallel vertical ribs 58 extending forwardly therefrom and the upper ends thereof have notches 60, see FIG. 4, extending into the upper ends thereof for the following purposes. The ejecting means also includes a lever 62 which extends forwardly from a pintle 64 that extends in opposite directions therefrom. The opposite ends of the pintle 64 are disposed pivotally within the notches 64 of the ribs 58. The levers 64 have an upper horizontal portion of limited width and depending from the same is a relatively thin planar leg 66 which terminates in a substantially vertical depending pin 68. Said pin extends through a slot 70 in the platform 46. The forward end of each lever 62 is provided with a finger engageable pad 72, one of which is shown in FIG. 3 in at least partially depressed position.

The ejecting mechanism also includes a transversely extending bottom plate 74 which is provided with several upstanding pillars 76 which are connected at the upper ends thereof by cement or otherwise, including screws, to the lower portion of platform 46. The forward wall of bottom plate 74 has an upstanding flange 78 at interrupted locations, as seen in FIG. 3, and also has end walls 80 at opposite ends thereof, one of which is clearly shown in FIG. 5. Also upstanding from the upper surface of the bottom plate 74 are a plurality of circular pivot members 82, one of which is shown in section in FIG. 5, there being one such pivot for each of the cylindrical receptacles 18, 20 and 22, as shown in phantom in FIG. 1.

The ejecting mechanism also includes with respect to each of the cylindrical receptacles a ring-like ejecting member 84 which have vertical walls defining an inner diameter respectively complimentary to the diameters of the various coins, whereby the lowermost coin in each stack in the several receptacles 18, 20 and 22 is disposed by gravity within the circular wall 86 of each of said members. In repose, the ejecting members 84 are disposed in the full line position shown in FIG. 5 and it will be seen that each of said members has a lateral projection 88 in which a pivot opening 90 is formed for disposition upon the pivot member 82 associated with each of the cylindrical receptacles. The lateral projection 88 on each of the projecting members 84 also is provided with a hole 92 within which is disposed the pin 68 associated with the leg 66 of each of the ejecting levers 62 associated respectively with the cylindrical receptacles 18, 20 and 22.

Figure 5:
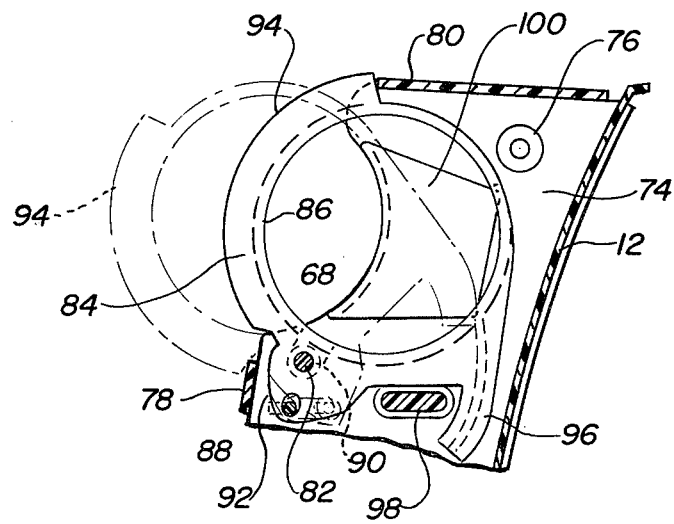
FIG. 5 is a fragmentary horizontal sectional view of the details of the coin changer shown in FIG. 4 as seen on the line 5—5 thereof.

The upper edge of at least the forward portion of the circular wall 86 of each ring-like member 84 is provided with an arcuate horizontal flange 94, as best shown in FIG. 5, and opposite the flange 94 is a somewhat arcuate tail member 96, the terminal end of which on at least certain of the ejecting members, as shown in FIG. 1, abuts the next adjacent ejecting member to stop further inward movement thereof. Also, extending upward from bottom plate 74, as shown in FIGS. 4 and 5, vertical abutments 98 are provided which also act as stop members as is best shown in FIG. 5 with respect to the left-hand endmost receptacle 18.

Further to account for the different thicknesses of the respective coins 24, 26 and 28 when the lowermost coin thereof is disposed within the circular wall 86 of the ejecting member, it will be seen from FIGS. 3–5 that somewhat trapezoidal-shaped platforms 100 are provided with respect to the cylindrical receptacles in order that only the lowermost coins in each stack within the receptacles are received within the ring-like ejecting members and the upper surface of said coin is substantially flush with the top of the circular wall of each of said members, whereby there is no lockup or malfunction occurring incident to ejecting the lowermost coin of each stack in the several receptacles.

For purposes of effecting return of the ejecting levers 62 after a coin has been ejected thereby, as best shown in FIG. 4, the inner, pintle ends of each of said levers is provided with a flexible depending tail 102, the lower portion of which abuts the upstanding wall 48 especially when the lever 62 is depressed, for example, to the phantom line position shown in FIG. 4. The tail 102 is molded integrally with each of the ejecting levers 62 and the plastic material selected for such members is such that adequate resilience is provided for the tail 102 to act as a spring member to effect return of the lever 62 to the uppermost position thereof after the lever has been released from manual engagement.

From the foregoing, it will be seen that the present invention comprises an educational type of toy which employs simulated toy coins of such diameters and thicknesses that they are readily distinguishable from each other. A holder comprising a plurality of cylindrical receptacles respectively receive the different sizes of coins individually and there is no possibility of depositing the coins in any of the receptacles except the one intended therefor, this being accomplished by providing entrance openings in the form of slots corresponding in length and width to the diameters and thicknesses of the respective coins. Further, the tops which override the cylindrical receptacles are provided with indicia adjacent the slots indicating the value of the coin to be deposited in said receptacles, thereby further facilitating the educational aspect of the toy in addition to the indicia on the coin. The various structural elements of the overall coin changer are of a strong nature and molded from durable plastic material, the various elements of the structure having certain features which facilitate the ready assembly of the components into a composite holder somewhat resembling a so-called street car conductor's coin changer but in vew of the elements being largely molded from plastic material, the structural differences are readily distinguishable patentably over any of the early metallic type coin changers, due primarily to the fact that in adapting the various elements to being formed from plastic, innovations in the structure necessarily had to be produced.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. A toy of an educational nature comprising in combination, a plurality of tubular receptacles supported in a frame adjacent each other, a plurality of toy coins respectively of different diameter and thickness corresponding to indicating means on the coins designating the values thereof, said frame having entrance openings respectively aligned with similar ends of said receptacles and having lengths and widths respectively corresponding to the different diameters and thicknesses of said coins, whereby only the coins of the diameter and thickness corresponding to the lengths and widths of the several entrance openings will pass therethrough into the receptacles, and removal means associated with each receptacle and operable to effect removal of the coins from said receptacles.

2. The toy according to claim 1 further characterized by said receptacles being disposed substantially vertically in use and having tops in which said entrance openings respectively are formed, and said removal means located at the lower ends of said receptacles in use.

3. The toy according to claim 1 further characterized by said coins being circular and relatively flat in shape, and also respectively of different diameters and thicknesses, and said entrance openings being slot-shaped in complement to the diameter and thickness of the respective coins to be passed therethrough into said receptacles.

4. The toy according to claim 3 further characterized by the diameters of the coins varying in accordance with the indicated values of the coins and the thickness of the coins varying in accordance with the indicated value thereof, and the lengths and widths of the coin-receiving slots varying in accordance with the diameters and thicknesses of the coins respectively to be received therethrough.

5. The toy according to claim 1 in which said removal means are mounted on similar ends of said receptacles opposite the inlet ends thereof and including a ring-like member of a height at least equal to the thickness of the thickest coin to be received therein from the corresponding receptacle, means pivotally supporting said member upon said frame for movement about an axis perpendicular to the plane of the coins in the receptacle, a lever respectively adjacent each receptacle and pivotally connected at one end to said frame for movement about a horizontal axis, the opposite end of each lever extending outwardly beyond the receptacles for manual engagement, a leg depending from each lever and having a lower end engaging a portion of said ring-like member in spaced relation to the pivot thereof, whereby when the opposite end of each lever is depressed said ring-like member is swung outwardly from beneath the receptacle associated therewith to remove a coin contained therein from said receptacle, at least said ring-like members and legs being molded integrally from plastic material, and an integral flexible tail connected to the pivoted end of each lever and depending therefrom for engagement with said frame in a manner to elevate said opposite end of its lever to initial position when manually released from discharging a coin from the receptacle.

6. The toy according to claim 5 in which said frame comprises a rear wall extending along said plurality of receptacles and further including pairs of parallel ribs projecting from said wall in latterally spaced relationship, the pivoted ends of said levers having a transverse pivot member thereon received in sockets formed in said parallel ribs, said tail on each lever being disposed respectively between the pair of parallel ribs for the lever and engagable with the portion of the rear wall between said pair of ribs.

7. The toy according to claim 5 further including a bottom wall extending forwardly from said rear wall beneath said ring-like members, a pivot pin extending upwardly from said bottom wall for each ring-like member and received within a pivot opening therein, and each leg on said levers terminating in a depending pin received in a hole formed in one side of each ring-like member in latterally spaced relation to said pivot opening therein, whereby when the outer end of one of said levers is depressed said pin will pivotally move the ring-like member engaged thereby about the pivot therefor in a direction to project the ring-like member forwardly of the bottom wall to expel a coin from the receptacle associated with said ring-like member and permit a coin to fall therefrom.

8. The toy according to claim 7 in which said ring-like members have cylindrical walls of an inner diameter complementary to the thickest of said coins, whereby said walls freely receive said coins and also propel them to discharge position.

9. The toy according to claim 8 further characterized by the bottom wall of the frame having platforms aligned vertically with said ring-like members and extending into the bottom of said members a sufficient distance to dispose the top surface of the bottommost coin flush with the top of said member and the rear portion of said members being cutaway to permit discharge movement of said members.

* * * * *